United States Patent [19]

Brown

[11] Patent Number: 5,797,010

[45] Date of Patent: Aug. 18, 1998

[54] MULTIPLE RUN-TIME EXECUTION ENVIRONMENT SUPPORT IN A SET-TOP PROCESSOR

[75] Inventor: Ralph W. Brown, Boulder, Colo.

[73] Assignee: Time Warner Cable, Stamford, Conn.

[21] Appl. No.: 577,210

[22] Filed: Dec. 22, 1995

[51] Int. Cl.⁶ .................................................. G06F 9/06
[52] U.S. Cl. .................................. 395/712; 395/652
[58] Field of Search ........................ 395/712, 651, 395/652, 653

[56] References Cited

U.S. PATENT DOCUMENTS

| | | |
|---|---|---|
| 3,956,717 | 5/1976 | Fisher et al. . |
| 4,214,316 | 7/1980 | Lipsky . |
| 4,506,387 | 3/1985 | Walter . |
| 4,530,008 | 7/1985 | McVoy . |
| 4,553,161 | 11/1985 | Citta . |
| 4,592,546 | 6/1986 | Fascenda et al. . |
| 4,823,386 | 4/1989 | Dumbauld et al. . |
| 4,991,208 | 2/1991 | Walker et al. . |
| 5,046,090 | 9/1991 | Walker et al. . |
| 5,067,072 | 11/1991 | Talati et al. . |
| 5,093,718 | 3/1992 | Hoarty et al. . |
| 5,168,353 | 12/1992 | Walker et al. . |
| 5,220,420 | 6/1993 | Hoarty et al. . |
| 5,225,267 | 7/1993 | Hansen et al. . |
| 5,311,423 | 5/1994 | Clark . |
| 5,343,239 | 8/1994 | Lappington et al. . |
| 5,347,632 | 9/1994 | Filepp et al. . |
| 5,357,276 | 10/1994 | Banker et al. . |
| 5,361,091 | 11/1994 | Hoarty et al. . |
| 5,361,358 | 11/1994 | Cox et al. . |
| 5,365,606 | 11/1994 | Brocker et al. . |
| 5,381,534 | 1/1995 | Shi . |
| 5,383,112 | 1/1995 | Clark . |
| 5,390,337 | 2/1995 | Jelinek et al. . |
| 5,394,394 | 2/1995 | Crowther et al. . |
| 5,400,402 | 3/1995 | Garfinkle . |
| 5,412,720 | 5/1995 | Hoarty . |
| 5,421,031 | 5/1995 | De Bey . |
| 5,422,674 | 6/1995 | Hooper et al. . |
| 5,423,555 | 6/1995 | Kidrin . |
| 5,425,027 | 6/1995 | Baran . |
| 5,426,699 | 6/1995 | Wunderlich et al. . |
| 5,442,700 | 8/1995 | Snell et al. . |
| 5,442,771 | 8/1995 | Filepp et al. . |
| 5,442,791 | 8/1995 | Wrabetz et al. . |
| 5,446,726 | 8/1995 | Rostoker et al. . |
| 5,452,297 | 9/1995 | Hiller et al. . |
| 5,453,979 | 9/1995 | Schibler et al. . |
| 5,455,701 | 10/1995 | Eng et al. . |
| 5,455,820 | 10/1995 | Yamada . |
| 5,455,825 | 10/1995 | Lauer et al. . |
| 5,459,722 | 10/1995 | Sherif . |
| 5,583,920 | 12/1996 | Wheeler, Jr. .................... 379/88 |
| 5,594,789 | 1/1997 | Seazholtz et al. ................ 379/207 |
| 5,635,979 | 6/1997 | Kostreski et al. ................. 348/13 |
| 5,650,994 | 7/1997 | Daley ............................. 370/259 |

OTHER PUBLICATIONS

Adams, Michael, "Network Design and Implementation of a large-scale, ATM, Multimedia Netwok," *Engineer Conference Notes* from NETWORLD^SM+INTEROP® 95, Las Vegas, NV (Mar. 27–31, 1995).

(List continued on next page.)

*Primary Examiner*—Kevin A. Kriess
*Attorney, Agent, or Firm*—Holland & Hart LLP; Homer L. Knearl

[57] ABSTRACT

The present invention is a novel system and method for supporting the execution of applications of a full service network whereby each application is designed and compiled to execute in a particular execution environment. As the user/subscriber makes a request for a service, the head end accepts the request as one for the downloading of the application associated with the service. The head end downloads the execution environment associated with the particular application. The execution environment is stored in memory at the requesting set-top processor. The application is also downloaded from the head end server to the requesting set-top processor and stored at the set-top processor. The set-top then executes the environment and the application in turn.

7 Claims, 8 Drawing Sheets

OTHER PUBLICATIONS

Adams, Michael, "Real Time MPEG Asset Delivery over ATM," *NCTA Technical Papers*, 1995:315–326 (1995).

News Release, "Time Warner Introduces World's First Full Service Network in Orlando," TIMEWARNER CABLE Full Service Network, Maitland, FL, 32751 (Dec. 14, 1994).

Product Information Package from Wink Communications, 2061 Challenger Drive, Alameda, CA 94501 (1995).

Request for Proposals, "Development of a Full Service Network: A request by Time Warner for assistance in building a full service telecommunications network" (Feb. 11, 1993), Time Warner Cable, Denver, CO.

Vecchi, Mario P., and Adams, Michael, "Traffic Management for Highly Interactive Transactional System," *NCTA Technical Papers*, 1995:258–266 (1995).

MULTIPLE RUN-TIME EXECUTION ENVIRONMENT SUPPORT IN A SET-TOP PROCESSOR

FIELD OF THE INVENTION

The present invention relates in general to a system and method for providing run-time execution support for applications running on set-top processors and, in particular, for providing run-time support for possibly many different environments executing on a set-top processor.

BACKGROUND OF THE INVENTION

With the advent of high speed, high bandwidth networking (e.g. transfer rates approaching one gigabit per second), "full-service" networks deliver a broad range of digital and analog services to large numbers of user/customers. Some of these services include, for example: video-on-demand, home shopping, video games, video conferencing as well as the usual host of analog television programming.

These full-service networks typically include a central source location (called a "head end") that provides the stream of data and programming to subscribers. The head end itself usually comprises a bank of powerful servers connected to very fast memory storage. The memory storage contains the data and applications requested by individual subscribers. As requests for data or programming are made, the head end services these requests by transporting the needed data and programming. The data and programming streams that enter into the subscriber's home are then processed by a "set-top processor" (also known as a set-top converter, home communications terminal (HCT), or the like).

The set-top processor is typically a computer in its own right, having a central processing unit, memory storage, and I/O support. Thus, in its simplest form, full-service networks are "heterogeneous" in that it consists a number of different processing platforms (e.g. head end servers, set-top processors, and possibly other intermediate processors) that potentially run a variety of different operating systems.

As the number of subscribers (and hence the peak number of requests) grows, there is a need for greater processing power to handle the demand for interactive services. In heterogeneous networks, several solutions have been tried to off-load the need for central processing of these requests. These solutions typically involve some form of distributed processing to handle the volume of requests.

In heterogenous networks, compatibility problems arise concerning the porting and running of application programs from a "source" computer to a heterogeneous, "target" computer. Generally, it is not possible to simply transfer an application programs, written and compiled to run on a particular processor and operating system, to a different computer using a different processor or operating system. As a result, a number of prior art solutions have been attempted to solve the compatibility problem.

U.S. Pat. No. 5,067,072 issued Nov. 19, 1991 to Talati et al. and U.S. Pat. No. 5,365,606 issued on Nov. 15, 1994 to Brocker et al. disclose a "virtual software machine" that provides a virtual execution environment in a target computer system for application software programs that have execution dependencies that are incompatible with the software execution environment on the target computer system. Generally, such virtual software machines provide a single environment to which all applications must be ported. Thus, virtual software machines impose an interface on all authors of applications who desire to have such applications execute on the virtual software machine.

U.S. Pat. No. 5,381,534 issued on Jan. 10, 1995 to Shi discloses a "high-level virtual computer" (HLVC) comprised of heterogeneous hardware and software environments. The functioning of a HLVC requires the identification of the disparate computers and the software modules (i.e. "software chips") on those computers to perform the task in question. Shi uses interprocessor communication (IPC) patterns to initialize distributed programs to facilitate location independence while these programs are relocated within the distributed environment.

U.S. Pat. Nos. 5,347,632 and 5,442,771 issued on Sep. 13, 1994 and Aug. 15, 1995 respectively to Filepp et al. disclose the performance gains that occur in an interactive network by storing application data local to the user sites and relying on the user site computing resources to manage the interactive session. Accordingly, Filepp et al. teach a method that enables a user's personal computer to be coupled to a computer network to establish a reception system suitable for supporting applications which include interactive text/graphic sessions created to enable the user to obtain information and conduct interactive events.

U.S. Pat. No. 5,361,358 issued on Nov. 1, 1994 to Cox et al. discloses a method for installing an application under a first operating system and translating the installation parameters into a set of similar parameters to assure proper execution under a second operating system.

U.S. Pat. No. 5,442,791 issued on Aug. 15, 1995 to Wrabetz et al. discloses a system and method for providing remote execution services in a heterogeneous computer network environment. The system has a number of resources comprising of at least two or more computer processors executing different operating systems, the resources being available to perform remote execution services.

While these solutions may work well for some heterogeneous networks, these solutions may not be the best for full-service networks. A typical subscriber, when deciding to subscribe to a cable service, is faced with paying a number of costs and charges. For example, connection fees, monthly fees, pay-per-service charges comprise some of the costs presented to the prospective subscriber. Given that most consumers exhibit some degree of cost sensitivity, it is desirable to reduce the cost presented to the consumer.

One component of the connection fees is the cost of the set-top processor itself. Since the set-top processor is perhaps the largest up-front cost presented to the subscriber, it is desirable to reduce the cost of the set-top processor. The material costs of the set-top processor may be reduced by providing a minimal amount of hardware needed to support the wide range of applications.

Memory is one hardware component that must be designed into the set-top processor. How much memory is sufficient depends upon the complexity and number of services available to the subscriber. Many applications in a full-service network are provided by third parties that have been designed to run on various hardware and software platforms. The set-top processor needs to provide an environment that will support the execution of these applications.

With the cost constraint, it is not desirable to construct a set-top processor that stores every conceivable execution environment needed to run all applications. That approach requires a great deal of memory that would necessarily grow as more applications become available to the subscriber. Likewise, the above-discussed solutions to the compatibility problem are not properly concerned with reducing the material cost of the subscriber's set-top processor.

Thus, there is a need to produce a cost effective set-top processor that can support the execution environments needed to execute the various applications that are, or will become, available to subscribers.

Therefore, it is an object of the present invention to provide a cost effective method for supporting a wide range of execution environments in a set-top processor.

SUMMARY OF THE INVENTION

Other features and advantages of the present invention will be apparent from the following description of the preferred embodiments, and from the claims.

The present invention is a novel system and method for supporting the execution of applications stored at the head end of a full service network whereby each application is designed and compiled to execute in a particular execution environment. As the user/subscriber makes a request for a service, the head end accepts the request as one for the downloading of applications associated with the service. The head end downloads the execution environment required for the particular application. The execution environment is stored in memory at the requesting set-top processor. The application is also downloaded from the head end server to the requesting set-top processor and stored at the set-top processor. The set-top then executes the environment and the application in turn.

One aspect of the present invention is seamless service presentation. When the subscriber makes a request for service, the present system ensures that, as the execution environment is downloaded from the head end, existing data streams flowing into the set-top are not interrupted. This presents a seamless flow of data and services provided to the subscriber. In one embodiment, multiple tuners are provided, whereby one tuner can continuously process the service already being provided to the subscriber when the request is made, and another tuner for the downloading of the execution environment and application. In another embodiment, one tuner can receive programming content on conventional NTSC analog television, while also downloading application data and/or execution environments in the vertical blanking interval or some other virtual channel.

One advantage of the present invention is versatility and extensibility. With the present invention, a set-top can support a wide range of applications where each application may require a separate run-time environment. Additional applications can be supported as they added to the list of available services without the need to upgrade the set-top.

Another advantage of the present invention is cost. The present invention facilitates a cost-effective way of supporting a wide variety of applications. Instead of requiring each set-top processor have sufficient memory to store every conceivable execution environment, the set-top need only have enough memory resources to store the largest such single environment.

For a full understanding of the present invention, reference should now be made to the following detailed description of the preferred embodiments of the invention and to the accompanying drawings.

DETAILED DESCRIPTION OF THE INVENTION

As mentioned, the present invention provides low cost set-top processors that support the execution of a variety of applications requested by a subscriber. The low cost of these processors is due in part to the reduction in the amount of memory needed to run the myriad of execution environments for these applications.

Figure 1:
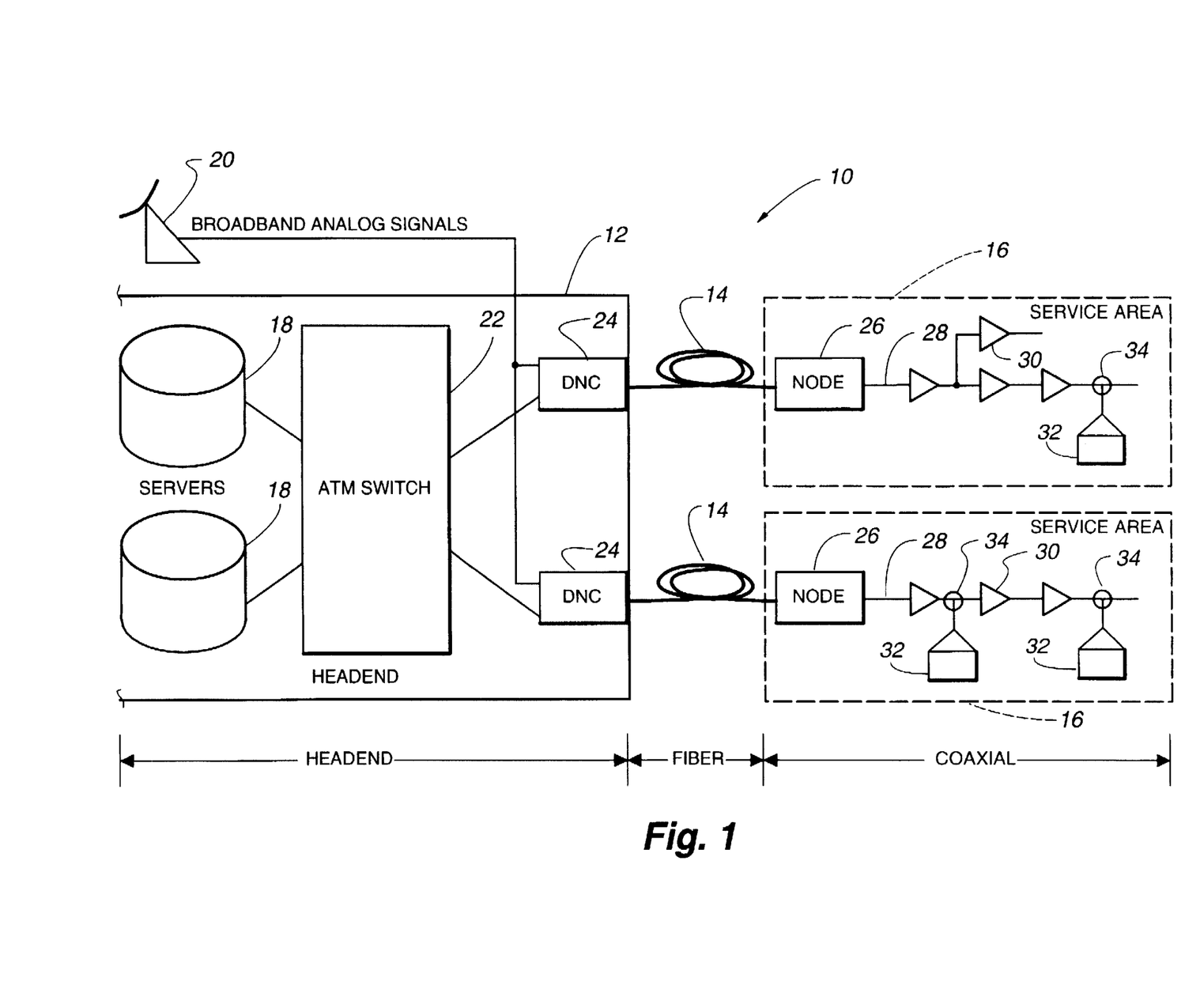
FIG. 1 is a high-level, block diagram of a full-service, interactive network that suffices for the purposes of the present invention.

As the present invention is directed to the set-top processor that processes digital and analog signals coming into a subscriber's home, any network delivering such signals will suffice for the purposes of the present invention. FIG. 1 is a high level block diagram of a full-service network that suffices for the purposes of the present invention. Network 10 depicts a hybrid fiber/coaxial (HFC) network that attempts to combine existing neighborhood coaxial networks 16 with an optical fiber head end to provide interactive services. Broadly, network 10 can be visualized as comprising three main parts: (1) a head end 12, (2) an optical fiber cable 14 for providing a high speed, reliable communications link to, (3) the various neighborhood service areas 16.

Head end 12 further comprises a set of servers 18 that receive service requests from subscribers and supplies both digital data and programming to the subscribers in response. The digital signals from servers 18 are routed through ATM switch 22 to the appropriate digital node controller 24 which services the neighborhood for the requesting subscriber. Analog broadcast signals 20 from existing community access television (CATV) may also be received by head end 12. These analog broadcast signals are modulated, together with the digital signals from servers 18, by digital node controllers 24 and transmitted to the neighborhood service areas 16.

As can be seen in FIG. 1, the neighborhood service areas 16 comprise a node 26 which converts the optical signal from fiber cable 14 into electrical signals that can be carried via coaxial cable 28. This coaxial cable represents a shared communications medium for multiple subscribers 32 that are connected in a given neighborhood. At certain intervals along the coaxial cable, the signal is boosted by amplifiers 30 to counteract the effects of signal attenuation. Subscribers 32 connect to this shared communications medium via drop-off points 34.

Figure 2:
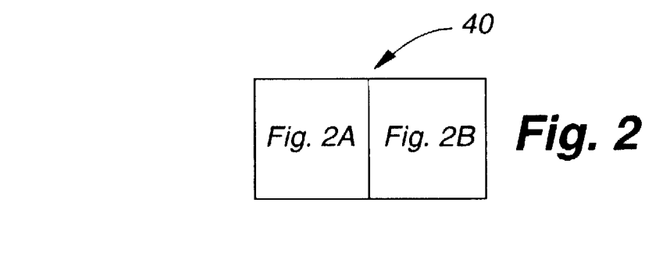
FIG. 2 is a more detailed embodiment of a full-service network such as disclosed in FIG. 1.
Figure 2A:
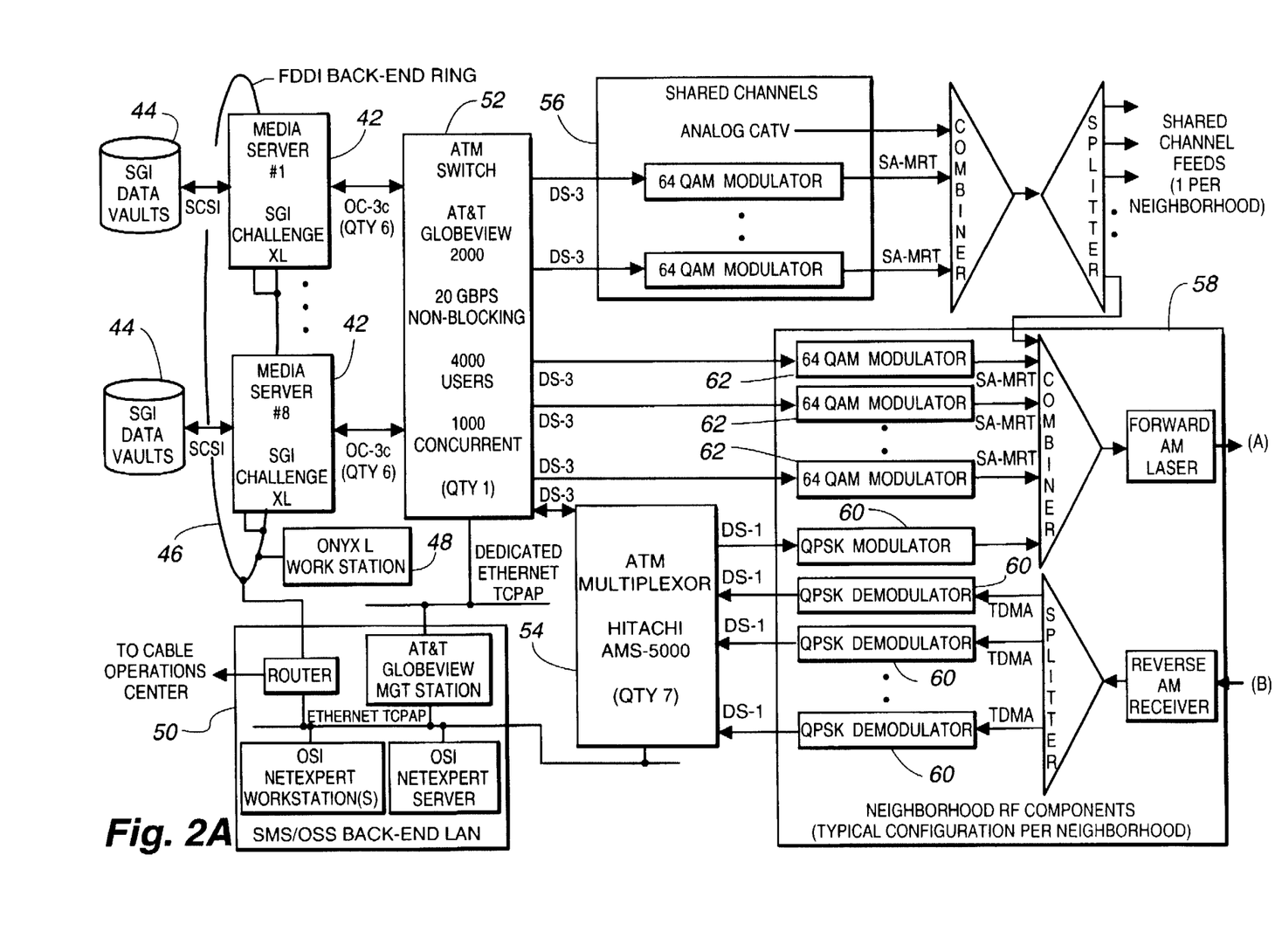
Figure 2B:
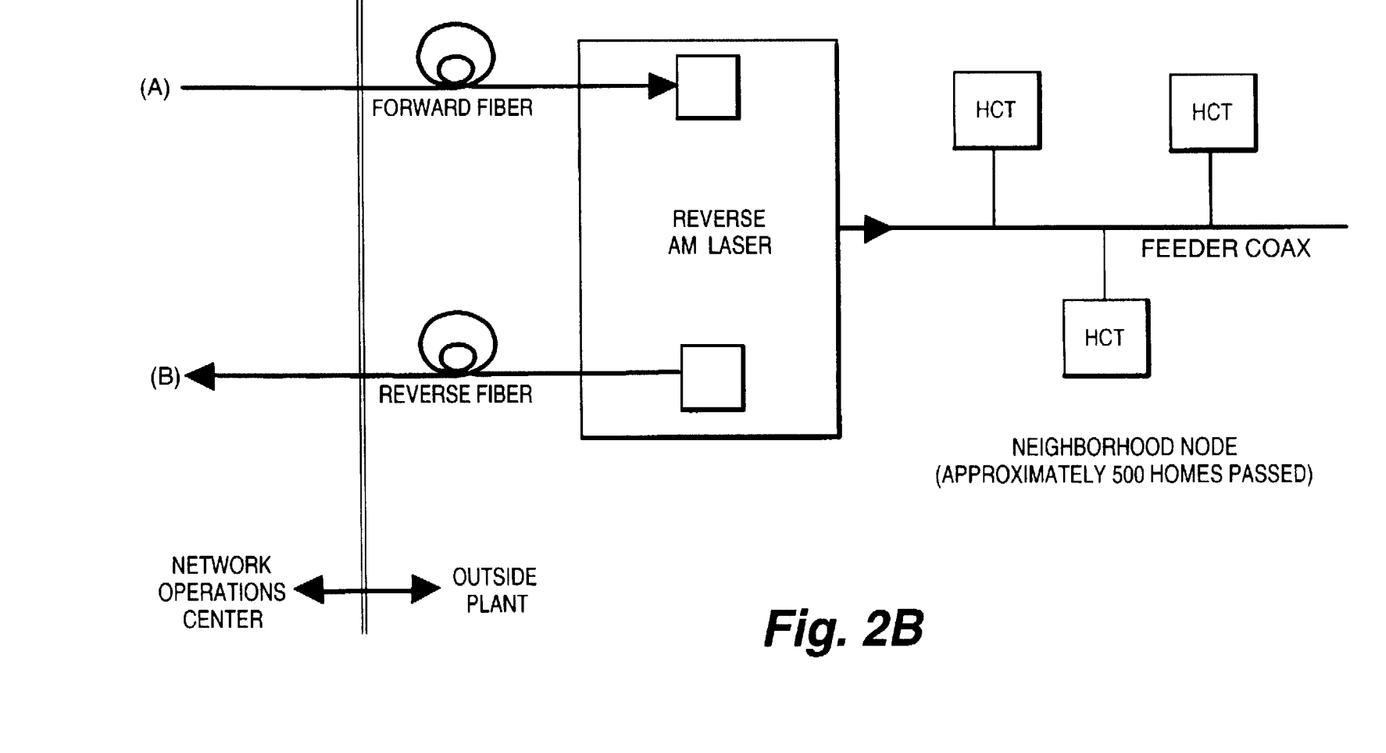

Network 10 is a generalized overview of a hybrid fiber/ coaxial (HFC) network. FIG. 2 gives a more detailed diagram of this type of network and is discussed in commonly assigned U.S. patent application Ser. No. 08/572,521, entitled "A METHOD FOR MESSAGE ADDRESSING IN A FULL SERVICE NETWORK", which is herein incorporated by reference. Although network 10 is described generally, it will be appreciated that many different types and topologies of networks would suffice for the purposes of the present invention. Thus, the scope of the present invention should not be limited to any particular network embodiment.

Figure 3:
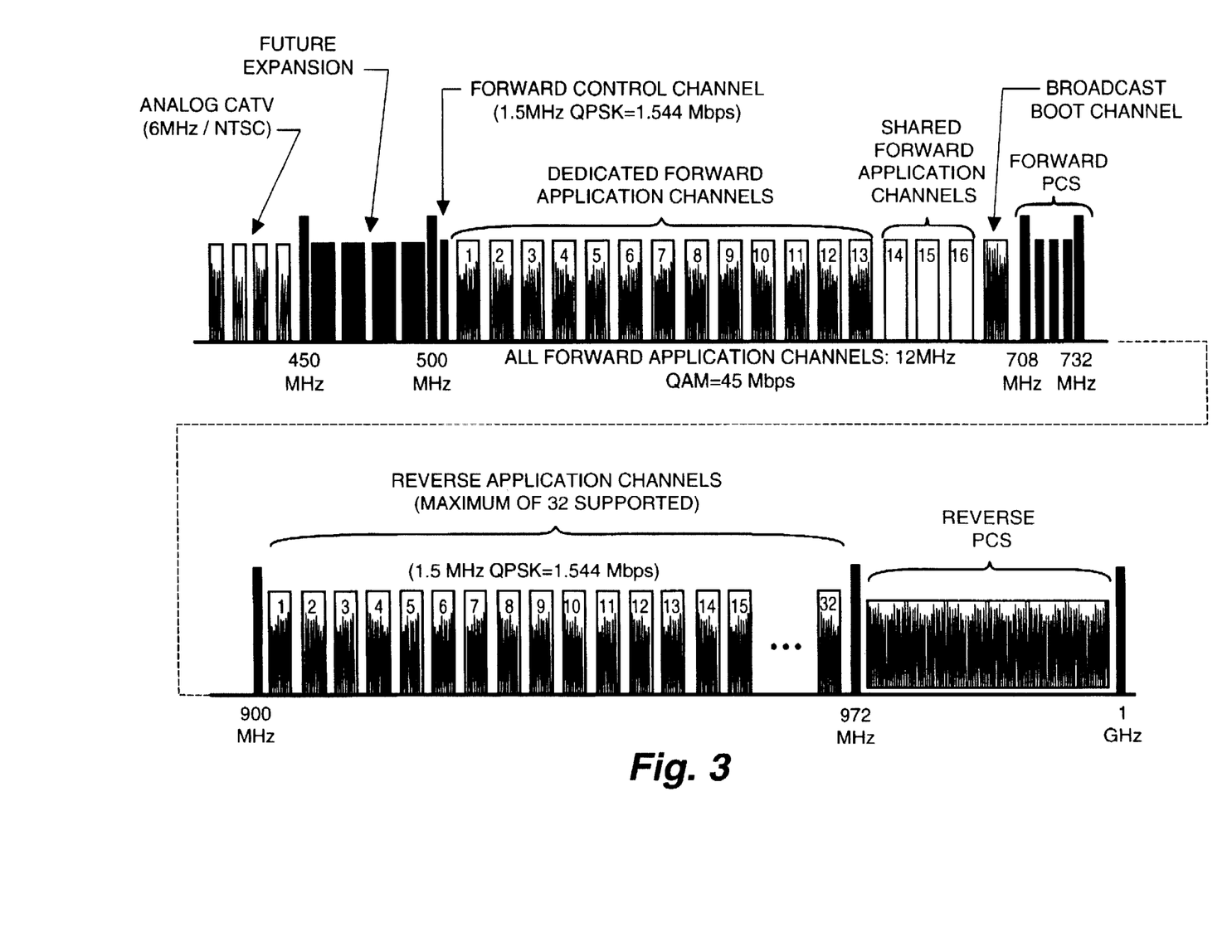
FIG. 3 is a diagram of a spectrum allocation scheme to enable communications within a full-service network.
Figure 4A:
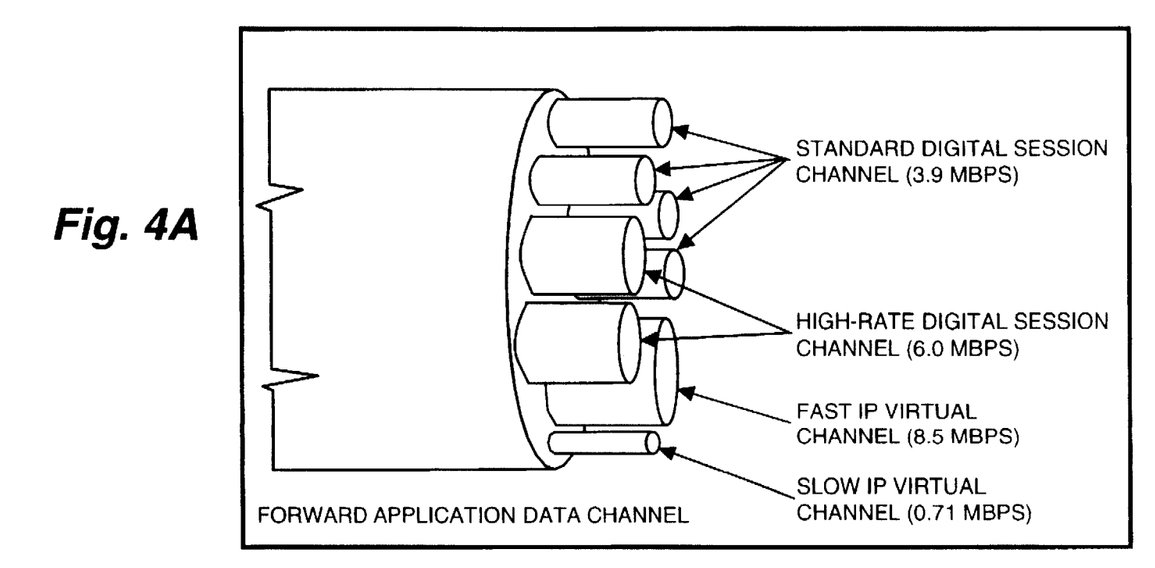
FIG. 4 is a diagram of the forward application and control channels to facilitate flow of data and instructions between the head end and subscribers in a full-service network.
Figure 4B:
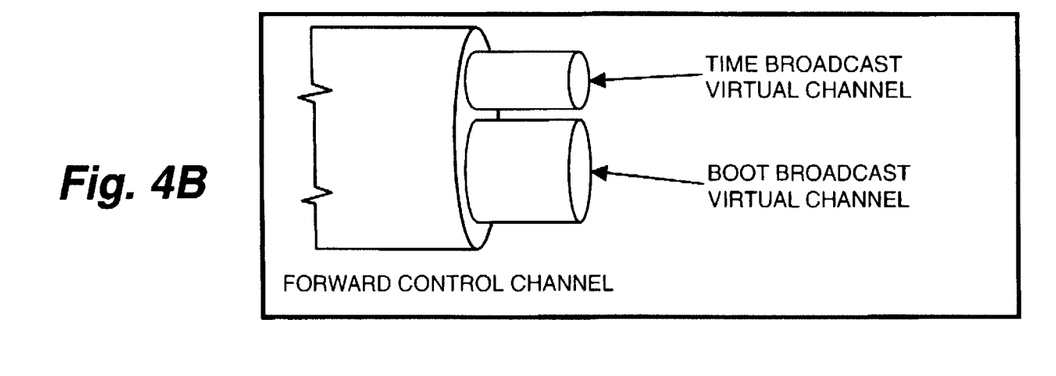

An important feature of a full-service network is that there is a forward and reverse flow of data and instructions between the head end and the subscribers' set top processors. FIGS. 3 and 4 show a particular implementation of a communications scheme to facilitate the transmission of subscribers' requests and services. FIG. 3 shows a radio frequency (RF) spectrum allocation scheme that could be implemented on network 10. Network 10 divides groups of subscribers into nodes 26 and each node 26 is directly connected to head end 12. Thus, each such node 26 has a unique RF spectrum. Although the channels are divided uniformly among all RF spectrums, each node contains unique digital signals. As seen in FIG. 4, the spectrum is allocated to support analog cable television services (CATV), interactive digital services, and personal communication services (PCS).

Traditionally, cable providers utilize frequencies between 50 MHz and 500 MHz to supply analog CATV services to subscribers. Thus, network 10 passes these same signals at the same RF spectrum. The spectrum above 500 MHz is allocated for interactive digital services and PCS. In order to provide interactive digital services, bi-directional communications paths are required. In the forward direction, the spectrum includes forward control channels (FCCs) and forward application channels (FACs).

In order to provide control information to the set-top processors in a particular node, each node contains a unique forward control channel. This channel is a relatively small bandwidth channel (1.5. Mbps) which is used to provide boot, security, and synchronization information to all subscribers in a specific node. In addition to the forward control channel, each node contains multiple forward application channels. These forward application channels are high bandwidth channels (45 Mbps) which are used to deliver data and video to a small group of six to seven users. As shown in FIG. 3, each node contains both dedicated and shared channels. The dedicated channels are used to provide interactive services to subscribers in specific nodes. The shared channels provide a common signal to all nodes. These channels are included to provide overflow capacity for nodes with large demands and "broadcast-like" functionality. Each node also contains reverse application and PCS channels. The reverse channels are shared by multiple users using a non-contention based, time division multiple access (TDMA) scheme.

FIG. 4 diagrammatically shows an embodiment of both the forward application data and forward control channels. The forward control channel provides time and boot broadcast information which is shared by all of the subscribers within a specific node. In one implementation, the forward control channel uses ATM virtual channels and their identifiers (VCIs) to subdivide the same physical channel. FIG. 4 depicts the sharing of the forward control channel using VCIs. The time broadcast cells are transmitted using one VCI and all of the boot broadcast cells are transmitted using a separate VCI. Downstream, the subscribers' set-top processors use VCI filters to identify the virtual channels and select the appropriate information.

The forward application data channels contains more bandwidth (45 Mbps) than the forward control channel and are used to provide high bandwidth connections to subscribers. The forward application data channels use ATM addressing to share the channel among a small group of subscribers and each channel contains multiple sub-channel allocations, as depicted in FIG. 4. These allocations include Fast IP, Slow IP, standard digital sessions and high-rate digital sessions, each identified by unique VCIs. In order to support a digital session (i.e. Video on Demand), each set-top processor must be allocated enough bandwidth to support a digital session. Most digital sessions require 3.9 Mbps of bandwidth in order to deliver the digital application, while some sessions require high-rate digital sessions (6.0 Mbps). Thus, both types of channels, standard and high-rate, are provided in the forward application data channel.

To support the transmission between the head end and the set-top processors, two allocations of the forward channel are made: the Fast IP and Slow IP channels. The Past IP channel supports the downloading of applications and large amounts of data to subscribers. This channel is shared by all users tuned to the particular channel. The Fast IP channel is sized (8.5. Mbps) to enable large file transfers to occur quickly for system response time and performance reasons.

When set-top processors tune to a particular forward application data channel, the processors are able to tune to one or more virtual channels. Once tuned to the virtual channels, the set-top processors must process all of the data passed over the channel (i.e. reassemble and filter the data based upon IP addresses). Given the amount of processing required, it is difficult for the set-top processor to tune and process the data from a digital virtual channel (3.9 Mbps) and the Fast IP virtual channel (8.5 Mbps) concurrently. Thus, a separate data allocation is used when running digital services. Specifically, the Slow IP channel (0.71 Mbps) is provided to transmit data to subscribers who are currently running other digital applications. Although this channel is smaller, the Slow IP is still capable of providing adequate bandwidth to support the data transmission needs of applications.

Although this above-described embodiment uses separate tuners to download application data while receiving service, it should be appreciated that, in another embodiment having only a single tuner, it is possible and well known to those skilled in the art to download application data in the analog NTSC channels during the vertical blanking intervals (VBIs).

The communication spectrum and allocation schemes of FIGS. 3 and 4 are but one of many possible schemes for the purposes of the present invention. It will be appreciated that the present invention is not limited to this particular implementation of the communication scheme. It only suffices that there exists a communication scheme to deliver both forward and reverse control data and application data between the head end and the subscribers' set-top processors.

As discussed above, although one forward channel will suffice for the download of content and application (e.g. using the VBI to download applications on the same channel as analog television), two or more forward channels will also suffice: one to deliver content (e.g. analog television signal), and a second for the application and run-time download.

Figure 5:
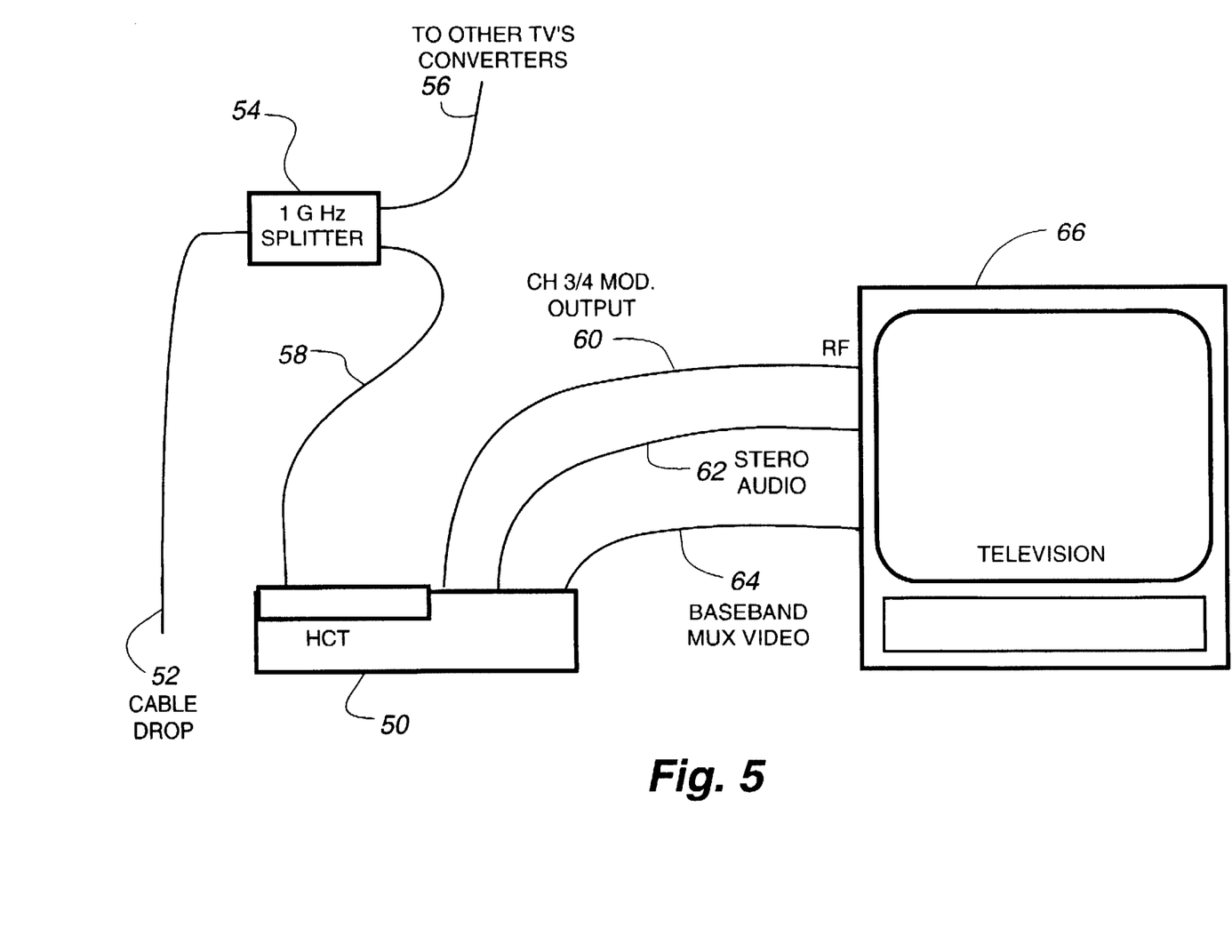
FIG. 5 is a block diagram of a subscriber's set-top processor as it connects within the subscriber's home.

FIG. 5 depicts subscriber's set-top 50 as it is connected in the home. Cable drop 52 brings the mixed digital/analog signals from the neighborhood node into the home. Splitter 54 allows the home to have more than one television connected to the full-service network through cable lines 56 and 58. Set-top 50 receives and processes the digital/analog signals. The resulting processed signals (e.g. RF 60, stereo audio 62, and baseband MUX video 64) are input into the subscriber's television set 66. These signals may comport with the current standards for proper television presentation (e.g. NTSC).

Figure 6:
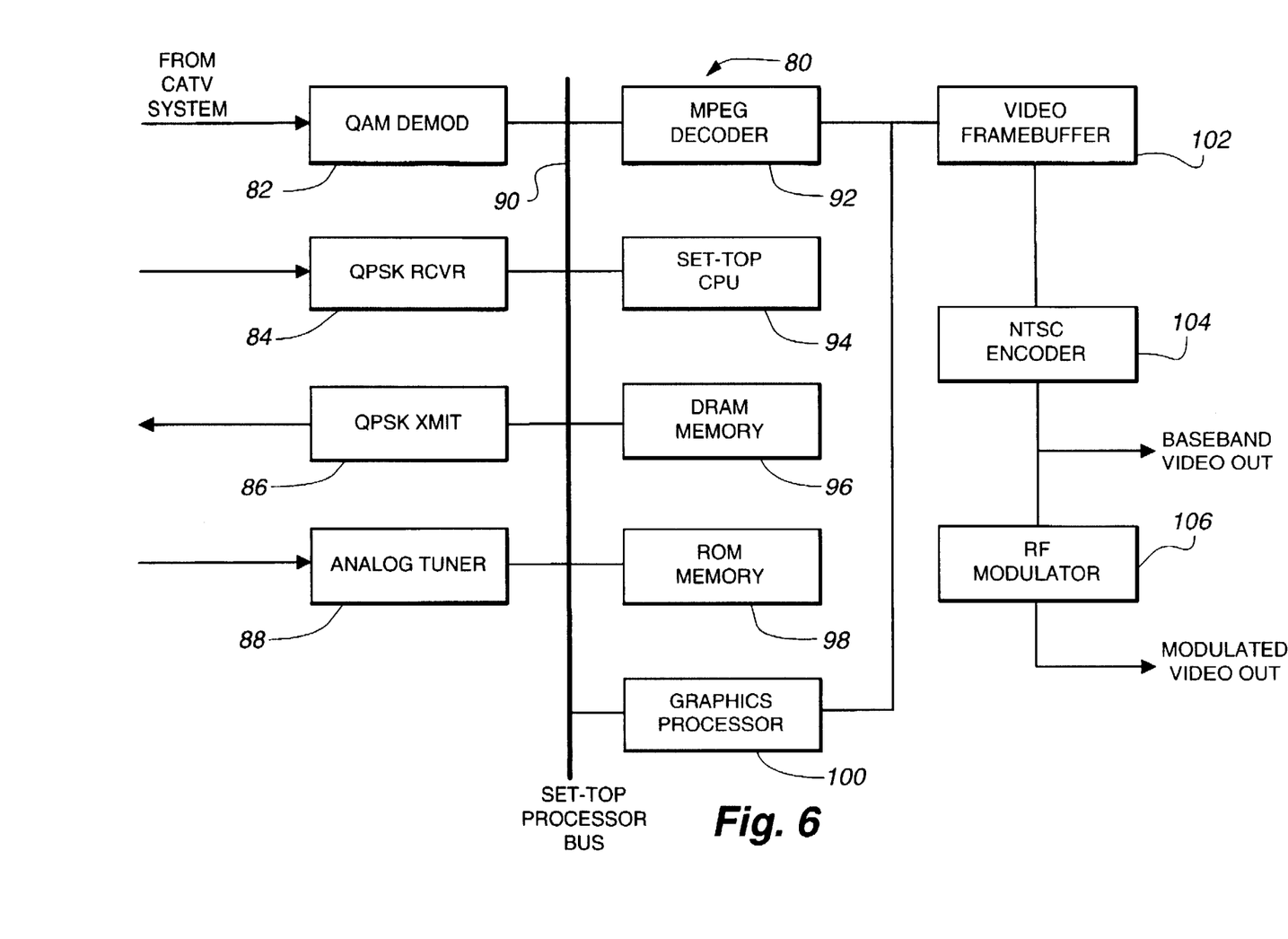
FIG. 6 is a block diagram of a set-top processor made in accordance with the principles of the present invention.

FIG. 6 is a block diagram of a set-top processor 80 made in accordance with the principles of the present invention. Broadly, set-top processor 80 comprises a number of processing and interface elements. To support the range of channels available to the set-top processor, several elements may be included: QAM tuner/demodulator 82, QPSK receiver 84, QPSK transmitter 86, and analog tuner 88.

In one embodiment, QAM demodulator 82 receives digitally compressed services transmitted in the 500 Mhz to 735 Mhz band of frequencies. The set-top processor may be designed to decompress MPEG-1 programming delivered in 64-QAM, 12 MHz channels. QAM demodulator 82 receives Scientific-Atlanta Multi-Rate Transport (SA-MRT) encoded data, a forward error correction scheme designed to accomplish both random and burst error protection. This data is then error corrected and the VCI is filtered to select data which is specifically addressed to the set-top processor. It will be appreciated that more than one QAM demodulator could be used in the set-top processor in order to tune to more than one digital channel at a time.

In one embodiment, QPSK receiver 84 is tuned to the forward control channel to receive control messages from the head end, processing 1.5 MHz channels at DS1 data rates. A unique forward control channel has been defined for each neighborhood such that all set-top processors in a particular neighborhood can be controlled from a single broadcast command. This forward channel is assigned a fixed channel and given a dedicated tuner in the set-top processor.

QPSK transmitter 86 is used to send control and data packets from the set-top processor to the head end over a reverse channel. QPSK transmitter may be a TDMA burst-mode transmitter designed to process 1.5 MHz channels between 900 MHz and 975 MHz at DS1 data rates. On one embodiment, two such QPSK transmitters could be employed in a set-top processor design where one transmitter is dedicated to reverse control communications and another transmitter dedicated to high-speed communications for additional bandwidth.

Analog tuner 88 receives standard 6 MHz NTSC analog channels transmitted from 54 to 500 MHz. Set-top processing allows for digital services to be superimposed over the analog content. For example, graphics or text overlays may be added to the video and digitized audio can be used to achieve better synchronization with the video. Thus, the feed from the analog tuner may either be directly input into the video input of the television or the digital services may be processed by the set-top processor. As noted, the downloading of application data may be accomplished by transmitting it over the vertical blanking interval (VBI) of the standard NTSC analog television broadcast.

Figure 7:
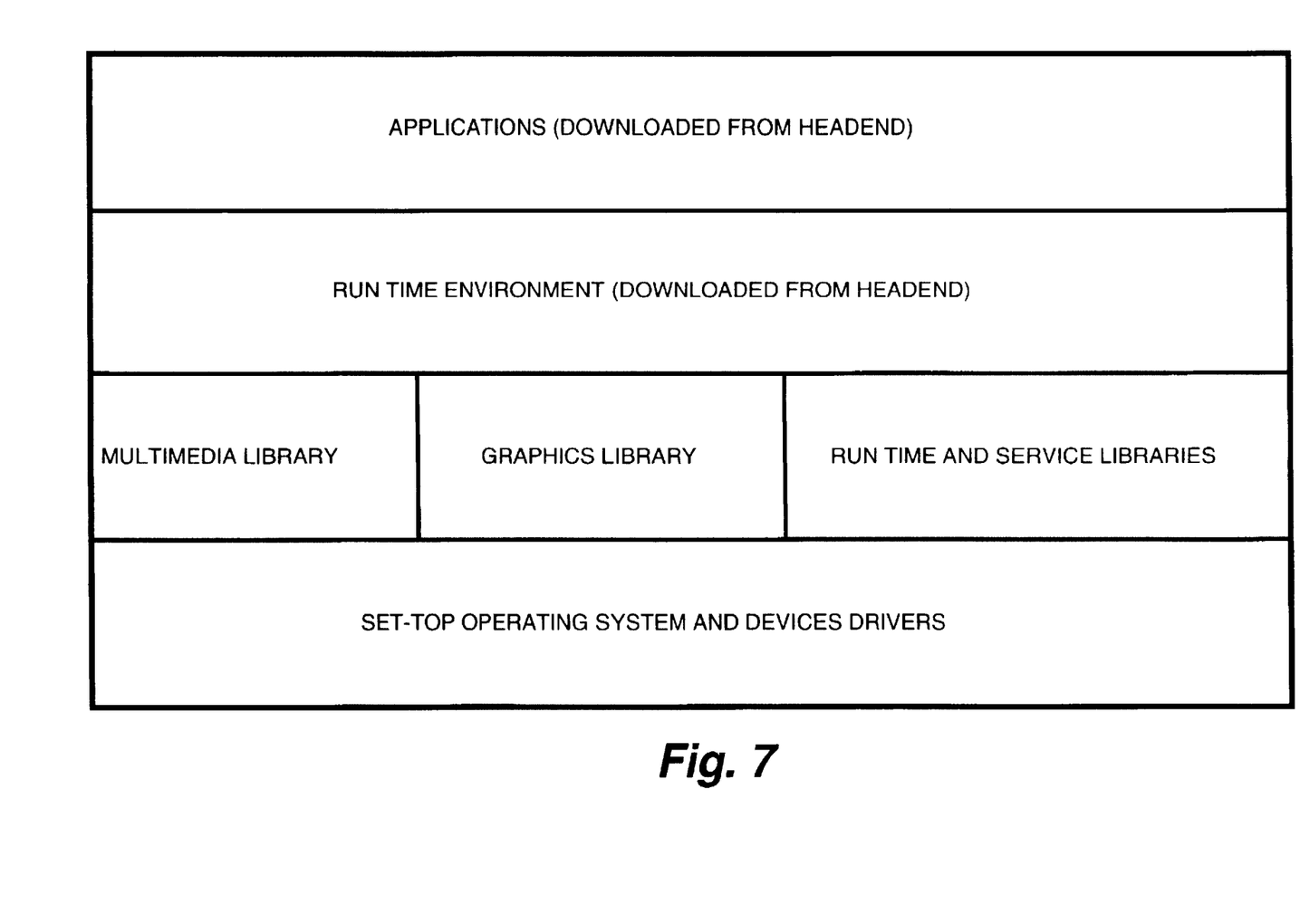
FIG. 7 is a block diagram of the software layers operating within the set-top processor.

These interface components are electrically coupled to processing components via set-top processor bus 90. The processing components include MPEG decoder 92, set-top CPU 94, DRAM 96, ROM 98, graphics processor 100, video framebuffer 102, NTSC encoder 104, and RF modulator 106. In one embodiment, ROM memory 98 contains a "native" set-top operating system, together with device drivers needed to interface with the subscriber television as well as driving an infrared transceiver (not shown) to accept subscriber selection and input. ROM 98 also may contain a number of libraries for facilitating the processing of services at the set-top. These libraries include a multimedia library, a graphics library, and a run-time and service library. These software modules are depicted in FIG. 7.

Executing together on the set-top CPU 94 are the run-time environment and applications that are downloaded from the head end. As noted above, there are a number of ways in which such applications and their associated environments are downloaded (e.g. via multiple digital tuners or via the vertical blanking interval in the NTSC analog broadcast). While downloading, the set-top processor could be receiving service. As the set-top is receiving service, downloaded instruction and data are stored in a storage unit such as DRAM memory 96 or other storage. When the downloading is complete, the set-top CPU 94 may allow the running of execution of the environment and application while service is continuing.

For example, as the subscriber is watching a home shopping channel over an analog channel, a interactive graphics application could be downloaded from the head end to allow the user to order any particular item currently showing on the channel. The head end would download both the ordering application and its environment to the subscriber's set-top processor. Once downloaded, the set-top CPU would run both the environment and application at the same time the analog broadcast is continuing.

A more detailed description of the set-top operating procedures is given below in Table 1:

TABLE 1

SET-TOP OPERATING PROCEDURES

```
BEGIN
    initialize and bootstrap /* find ROM loaded data for initial
    state */
    state = broadcast_mode
    channel = default_channel
    frequency = default_frequency
    exec_environment = native
    while (!power-off)
        do
        state = broadcast mode [| on-demand|
        channel = digital [| analog | virtual|
        exec_environment = native |I wink | interplay | OMO |
MMOSA | CLP | etc.]
        frequency = *frequency*
        application = current_application
        while (continue) do
            receive posted_event
            if (posted_event_context is application)
                continue
            else
                break
        fi
    endwhile
    /* event signals different execution environment is needed */
    search event_table for posted_event
    if(found) /* could be a channel up-down, power, etc. or an app
            generated event */
        map posted_event to required state
        map posted_event to required channel
        map posted_event to required execution environment
        if (download capable)
            set download to no | yes
                /* depends on exec_environment */
        else
            return (error)
        fi
        set application = event_table.application
    else
        return error /* unknown event */
    fi
    switch (download)
        case true:
```

TABLE 1-continued

SET-TOP OPERATING PROCEDURES

```
        state = on-demand
        channel = digital
        exec_environment = post_event.exec_environment
        send teardown message to application
        send message to head-end
        /* establish connection and session with server */
            receive message with frequency
            tune to frequency
            receive network download
            if (network download = success)
                break
            else
                return error
        case false:
            state = broadcast
            channel = analog
            exec_environment = post_event.exec_environment
            frequency = application.frequency
            break
        endswitch
    endwhile          /* power off */
    if state = on-demand
        send teardown message to application
        send teardown message to network session & connection
        initiate shutdown
    else
        initiate shutdown
    fi
```

As noted from the pseudo-code description of the set-top operating procedures, the set-top has two active states: broadcast and on-demand. Broadcast state is the default state of the set-top processor upon start-up. The set-top automatically sets the channel to the boot broadcast virtual channel and tunes to the appropriate frequency. The set-top processor then sets up a minimal, "native" execution environment that allows the set-top to function as a receiver of broadcast data and services.

The set-top continues in a continual processing loop while the set-top is operating. As the set-top is waiting for the subscriber to order an interactive service, the set-top remains in "broadcast" state. While in this state, the subscriber may cause the set-top to change channels (e.g. to broadcast digital, broadcast analog, or virtual ), which in turn may cause the set-top to change its execution environment. "Events" are posted to an event queue by the set-top kernel. This provides a common scheme for managing all types of system events, such as remote control input from the subscriber, signals from the head end, and the like.

Upon request for interactive service, the set-top changes its state to "on-demand" and channel to "digital". A "teardown" message is sent to any currently executing application in order to effect a "graceful" termination of service and a separate message is sent to the head end requesting the new application service. The head end responses with a message indicating which frequency to tune, if the request is satisfied.

There has thus been shown and described a novel system and method for support of a multitude of execution environments in a set-top processor which meets the objects and advantages sought. As stated above, many changes, modifications, variations and other uses and applications of the subject invention will, however, become apparent to those skilled in the art after considering this specification and accompanying drawings which disclose preferred embodiments thereof. All such changes, modifications, variations and other uses and applications which do not depart from the spirit and scope of the invention are deemed to be covered by the invention which is limited only by the claims which follow.

I claim:

1. In a network providing data-services to subscribers, said network including a head-end having servers for receiving requests for data-services from subscribers, and said network including memory for storing data-services, for storing applications related to data-services and for storing execution-environments that are designed and compiled to enable execution of applications, said head-end being coupled to a plurality of set-tops that are resident at subscriber locations, a method for supporting execution of applications by processors that are within said set-tops, comprising the steps of:

sending a request for data-service from a given set-top to said head-end;

accepting said data-service request at said head-end;

downloading from said head-end to said given set-top execution-environments designed and compiled to enable processor-execution of applications;

accepting and storing said downloaded execution-environment at said given set-top;

downloading from said head-end to said given set-top applications;

accepting and storing said downloaded applications at said given set-top; and utilizing a processor within said given set-top to execute said stored applications by the use of said stored execution-environment.

2. The method as recited in claim 1 wherein said step of downloading said execution-environment further comprises downloading said execution-environment at the same time that a subscriber associated with said given set-top processor is receiving service from said head-end.

3. The method as recited in claim 2 wherein said service is analog television programming.

4. The method as recited in claim 2 wherein said service is a digital service.

5. The method as recited in claim 2 wherein said step of downloading said execution-environment is accomplished by tuning a plurality of channels of said given set-top processor, wherein one channel receives said service and another channel receives said execution-environment.

6. The method as recited in claim 5 wherein said step of downloading said execution-environment is accomplished by tuning said given set-top processor to a physical channel, said physical channel comprising a virtual channel.

7. The method as recited in claim 6 wherein said physical channel is an analog television channel and said virtual channel is a vertical blanking interval of said analog television channel.

* * * * *